United States Patent
Dobson

(10) Patent No.: US 6,925,759 B2
(45) Date of Patent: Aug. 9, 2005

(54) APPARATUS AND METHOD OF FASTENING A LATCH MECHANISM IN A VEHICLE DOOR

(75) Inventor: Simon Blair Dobson, Kent (GB)

(73) Assignee: ArvinMeritor Light Vehicle Systems (UK) Ltd., Sully-sur-Loire (FR)

( * ) Notice: Subject to any disclaimer, the term of this patent is extended or adjusted under 35 U.S.C. 154(b) by 24 days.

(21) Appl. No.: 10/347,817

(22) Filed: Jan. 21, 2003

(65) Prior Publication Data

US 2003/0140567 A1  Jul. 31, 2003

(30) Foreign Application Priority Data

Jan. 21, 2002  (GB) ............................................. 0201215

(51) Int. Cl.[7] .............................................. E06B 3/00
(52) U.S. Cl. ...................................................... 49/503
(58) Field of Search ............... 49/502, 503; 296/146.5, 296/146.6

(56) References Cited

U.S. PATENT DOCUMENTS

| | | | |
|---|---|---|---|
| 5,364,157 A | | 11/1994 | Siedlecki |
| 5,573,297 A | * | 11/1996 | DeRees et al. .......... 296/146.6 |
| 5,902,004 A | * | 5/1999 | Waltz et al. ............. 296/146.9 |
| 6,205,714 B1 | | 3/2001 | Staser et al. |
| 6,378,251 B2 | * | 4/2002 | Fukumoto et al. ............ 49/503 |

FOREIGN PATENT DOCUMENTS

| | | | | |
|---|---|---|---|---|
| GB | 2 031 052 | | 4/1980 | |
| JP | 56154321 | | 5/1980 | |
| JP | 04100730 A | * | 4/1992 | .................. 49/503 |
| JP | 6-183258 | * | 6/1994 | .................. 49/503 |
| WO | WO01/23201 A1 | | 4/2001 | |

* cited by examiner

*Primary Examiner*—Jerry Redman
(74) *Attorney, Agent, or Firm*—Carlson, Gaskey & Olds

(57) ABSTRACT

A vehicle door comprising a strengthening structure, an inner door skin and a latch mechanism to be housed within the door, said mechanism having an engagement element that co-operates with the strengthening structure to allow the mechanism to be presented for rigid fixing within the door after the inner skin has been positioned relative to the strengthening structure; wherein at least one fixing element rigidly holds both the inner door skin and the latch mechanism to the strengthening structure.

16 Claims, 4 Drawing Sheets

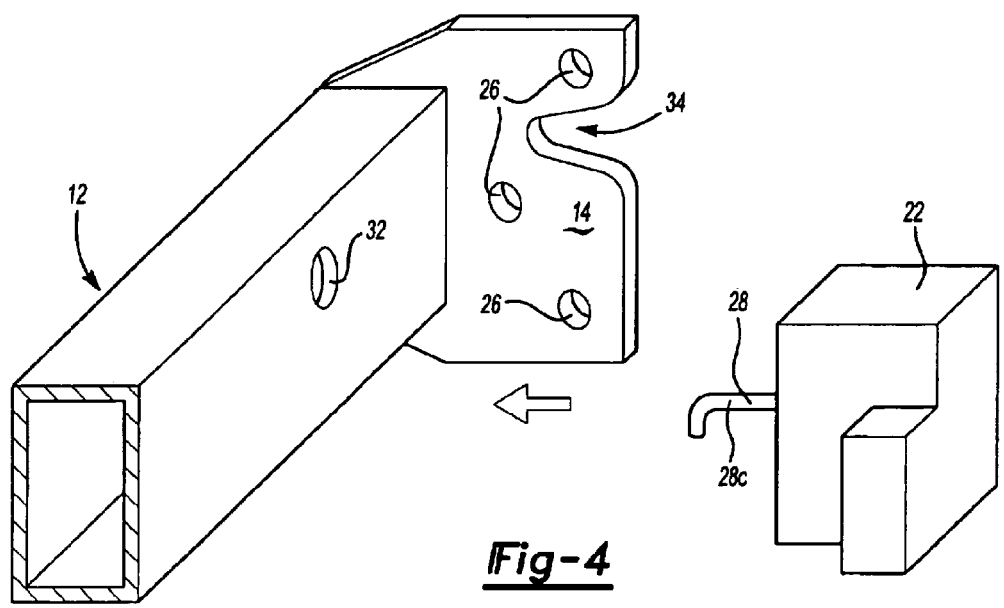
_Fig-4_
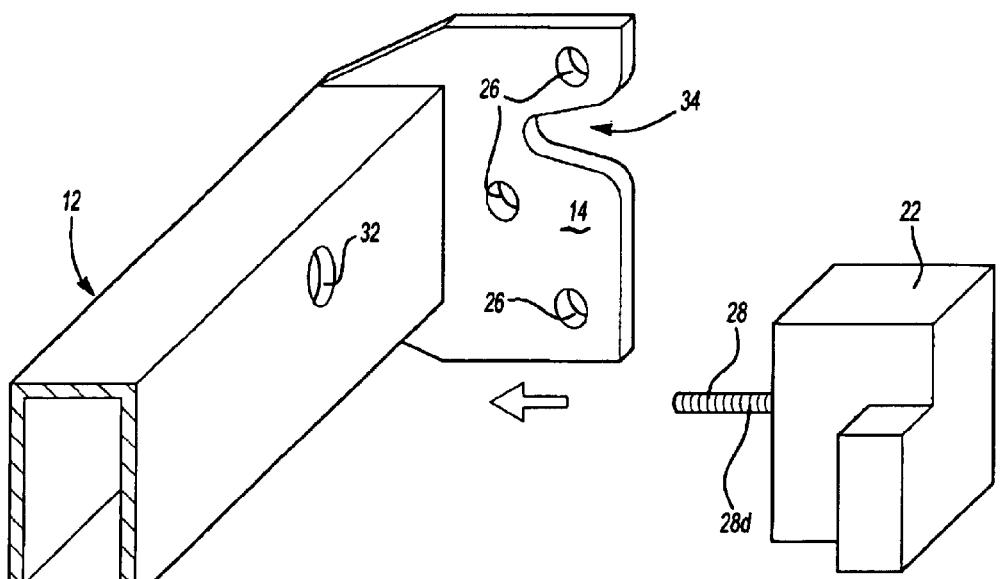
_Fig-5_

APPARATUS AND METHOD OF FASTENING A LATCH MECHANISM IN A VEHICLE DOOR

This application claims priority to Great Britain patent application No. GB 0201215.1 filed on Jan. 21, 2002.

BACKGROUND OF THE INVENTION

The present invention relates to a vehicle door, and in particular to an apparatus and method for locating and fastening a door latch within such a door.

A typical vehicle door comprises an inner skin having an aperture and an outer skin. The aperture is provided to allow a door latch mechanism to be mounted directly onto a locally reinforced fixing area on the inner skin. A strengthening structure, such as side impact bar, may be fixed to the inner skin. The outer skin has little impact strength compared with the inner skin. During assembly of the door, the aperture allows the latch mechanism to be appropriately positioned within the door by an assembly worker or machine, prior to rigid fixing of the latch mechanism to the inner door skin, usually by three or so screws.

The impact strength of vehicle doors during both head on and side collisions is of paramount importance. While traditional doors with impact bars fixed to an inner door skin provide improved protection for vehicle passengers, their performance is limited by the strength of the inner door skin. A new type of vehicle door has been proposed, such as in PCT Application WO 01/23201 A1, where the strength of the door is principally provided by an inner structural member typically comprising a bar type frame with one or more cross members. Part of the frame may have a generally "U-shaped" cross section to provide runner means for mounting a retractable glass window. Such doors preferably have a thin continuous inner skin to provide a seal, but this is insufficiently strong or stiff to support the loads required for a latch mounting. Hence, in such doors it is necessary to attach the door latch directly to the structural member.

During assembly, it is necessary to position the latch mechanism, albeit non rigidly, such that when the inner door skin has been fixed to the structural member and outer door skin has been positioned ready for fixing to the structural member, the latch mechanism is maintained in a position which allows a fixing member to be inserted through holes in the outer door skin and strengthening structure and engage a thread in the lock mechanism, but equally allows the latch position to be controlled by the fixing member when it is tightened. This presents a problem as the latch mechanism cannot be held in position by an assembly worker or machine during assembly, unless the inner skin is fitted after the latch mechanism. This is disadvantageous as it requires extra fixing means and in particular as it is often necessary to verify the fixing torque of the latch after assembly of other components since this is a safety critical item.

SUMMARY OF THE INVENTION

An object of the present invention is to provide an improved apparatus and method of fastening a latch mechanism in a vehicle door. Another object is to provide a latch mechanism for a vehicle door that has improved resistance to forced opening as a result of a vehicle collision. A further object is to provide an apparatus that assists the assembly of latches and like mechanisms to a vehicle door having an inner and outer door skin mounted on a strengthening structure. Another object of the invention is to provide a method of fixing door latch mechanisms to such doors.

According to one aspect, the invention comprises a vehicle door including a strengthening structure, an inner door skin and a latch mechanism to be housed within the door. The latch mechanism has an engagement member that cooperates with the strengthening structure to allow the latch mechanism to be presented for rigid fixing within the door after the inner skin has been positioned relative to the strengthening structure. A fixing member rigidly holds both the inner door skin and the latch mechanism to the strengthening structure.

According to another aspect, the invention comprises a latch mechanism, which is adapted to be fixed to both a door strengthening structure and to an inner door skin. The latch mechanism has an engagement member that cooperates with the strengthening structure to allow the latch mechanism to be presented for rigid fixing within a vehicle door after the inner skin has been positioned relative to the strengthening structure. A single fixing member rigidly holds both the latch mechanism and the inner door skin to the strengthening structure.

A further aspect the invention comprises a method of fixing a latch mechanism to a vehicle door. The method includes the steps of non rigidly attaching the latch mechanism, so that it is positioned for subsequent rigid fixing, to a strengthening structure using an engagement member fixed to the latch mechanism that cooperates with the strengthening structure. The method further includes the steps of positioning an inner door skin relative to the strengthening structure and rigidly fixing both the inner door skin and the latch mechanism to the strengthening structure by a fixing member.

These and other features of the present invention will be best understood from the following specification and drawings.

BRIEF DESCRIPTION OF THE DRAWINGS

An embodiment of the invention will now be described by reference to the following diagrammatic illustrations in which:

FIG. 4 shows a perspective view of the strengthening structure and the latch mechanism where the latch mechanism includes a hook;

FIG. 5 shows a perspective view of the strengthening structure and the latch mechanism where the latch mechanism includes a flexible screw;

DETAILED DESCRIPTION OF THE PREFERRED EMBODIMENT

Figure 1:
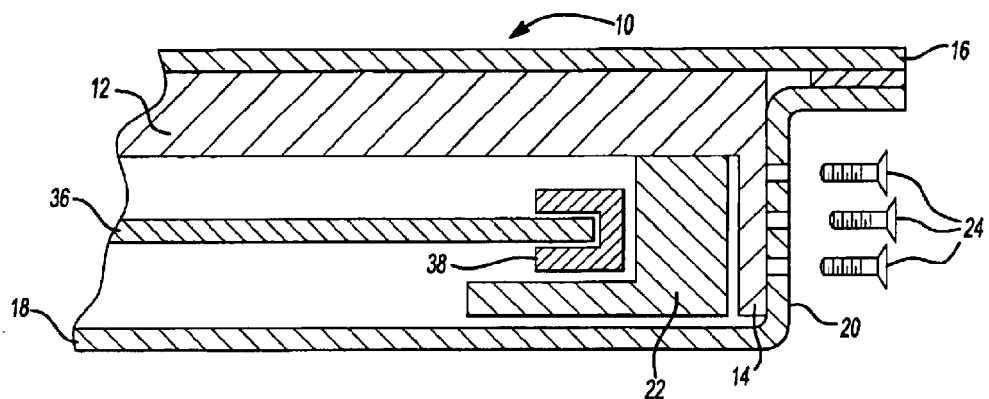
FIG. 1 shows a section of part of a vehicle door in plain view.
Figure 2:
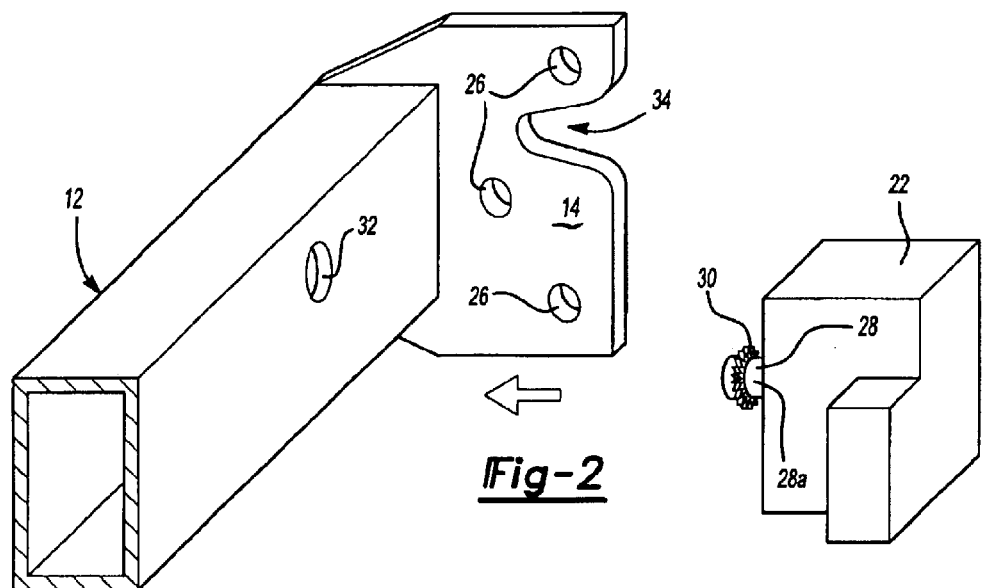
FIG. 2 shows a perspective view of a strengthening structure and a latch mechanism according to the invention where the latch mechanism includes a spigot.

FIG. 1 schematically shows in plan view that part of a vehicle door 10 near a door latch mechanism 22. The door 10 comprises a strengthening structure 12 housed within an outer door skin 16 and an inner door skin 18. The strengthening structure 12 is generally elongate and tubular, of hollow cross section, and has a plate 14 attached to or formed at one end. The plate 14 may be attached to the strengthening structure 12 by various means, such as by welding or by screws (not shown). The plate 14 has a "V-shaped" notch 34, provided to allow passage of a body mounted latch striker so that the latch mechanism 22 can function and engage the striker. In one example, the plate 14 has three holes 26 to allow rigid attachment of the latch mechanism 22 to the plate 14 of strengthening structure 12. The latch mechanism 22 may take many forms, but will always be housed within the door 10 between the door skins near the rim portion 20 of inner door skin 18 which is, in this case, a rear edge of a side opening door hinged at its front edge. The rim portion 20 also has three holes (not shown) configured to align with holes 26 in the plate 14 when the latch mechanism 22 is rigidly fixed to the door.

The latch mechanism 22 has an engagement member, such as a protrusion 28, that co-operates with a fixing hole 32 in strengthening structure 12 to allow fixing of the latch mechanism 22 (see below). In the present embodiment, the protrusion 28 takes the form of a flexible spigot 28a with deformable teeth 30, is made of plastics material and is attached to the latch mechanism 22 by conventional means. This is a preferable feature that allows sufficient flexibility or toleranced play in the fit between the three fixing members 24 and the holes 26, insuring that the fixing members 24 cause the latch mechanism 22 to be positioned correctly relative to the strengthening structure 12, and optionally in conjunction with other elements such as a tongue and slot or hook (not shown). The fixing members 24 of the present embodiment are threaded fasteners in the form of screws.

Thus, during assembly of the door, the outer door skin 16 is attached to the strengthening structure 12, the latch mechanism 22 is non-rigidly attached to the strengthening structure by the protrusion 28 (a spigot 28a) and the inner door skin 18 is then positioned against the inside of the strengthening structure 12 for fixing. The inner door skin 18 is fixed in part to the strengthening structure 12 by the three fixing members 24 that pass through the holes in the rim portion 20 of the inner door skin 18, through the holes 26 in the plate 14 and thereby into threaded bores in the latch mechanism 22 (not shown). On tightening the fixing members 24, the latch mechanism 22 is rigidly fixed to the strengthening structure 12 in the correct position relative to the rear of the door 10.

The door 10 will also typically have a glass window 36 retractably mounted on guide channels 38 (only one shown). The guide channels 38 may be formed as part of a frame strengthening structure, for example using a frame strengthening structure with a "U-shaped" cross section.

The strengthening structure may take a variety of forms. For example, it may comprise a frame located between the inner door skin 18 and outer door skin 16 near the edge of the door 10. It may comprise such a frame with one or more side impact bars. The cross section of the frame members/bars can be other shapes besides tubular, for example "L" or "U" shaped. In another aspect, the plate 14 may be formed as an integral part of strengthening structure 12 and/or the strengthening structure 12 may itself be formed by joining more than one elongated component.

Figure 3:
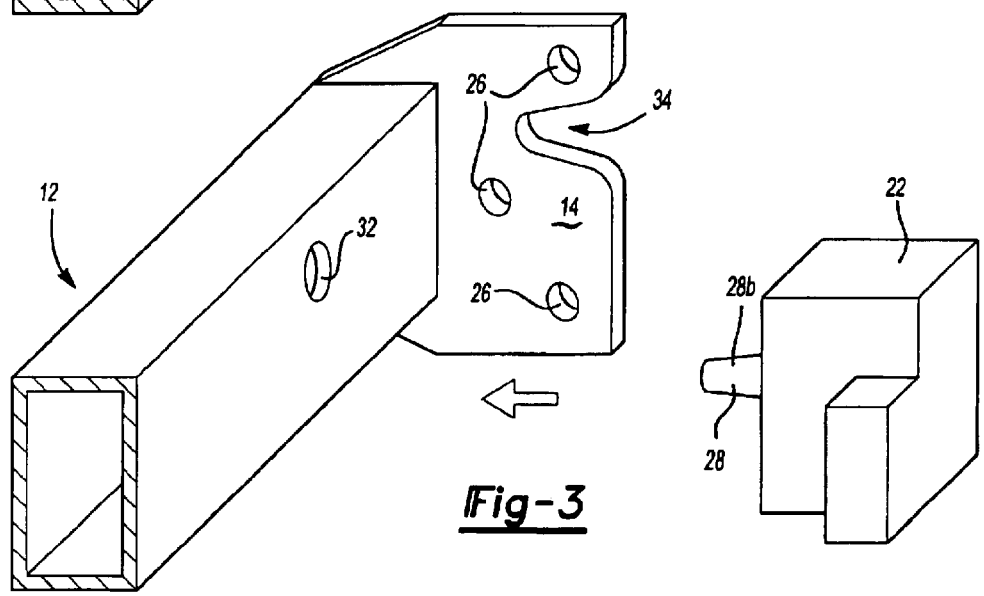
FIG. 3 shows a perspective view of the strengthening structure and the latch mechanism where the latch mechanism includes a tongue.
Figure 6:
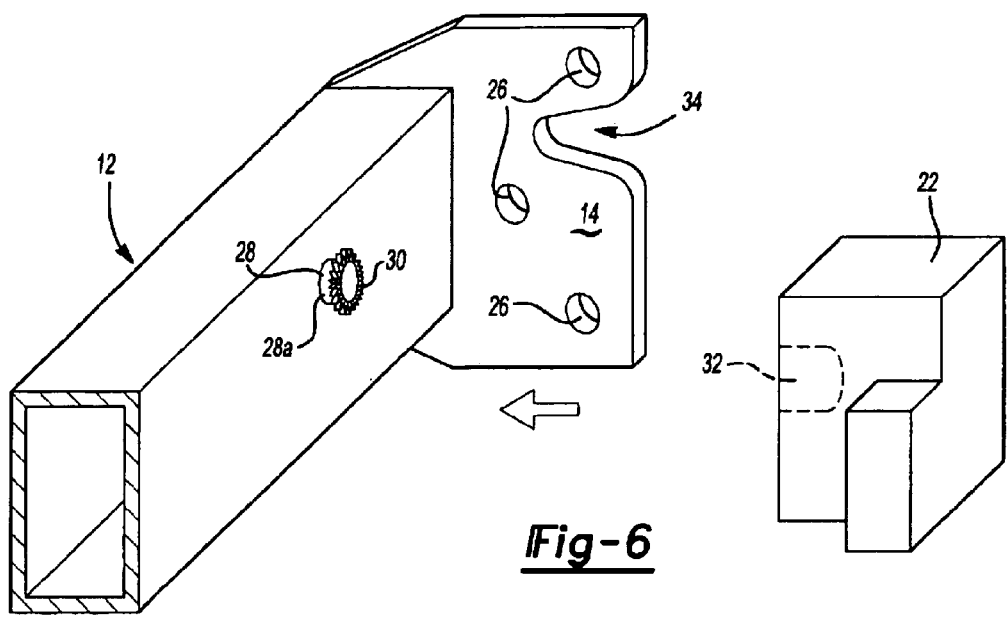
FIG. 6 shows a perspective view of the strengthening structure and the latch mechanism where the strengthening structure includes a spigot.
Figure 7:
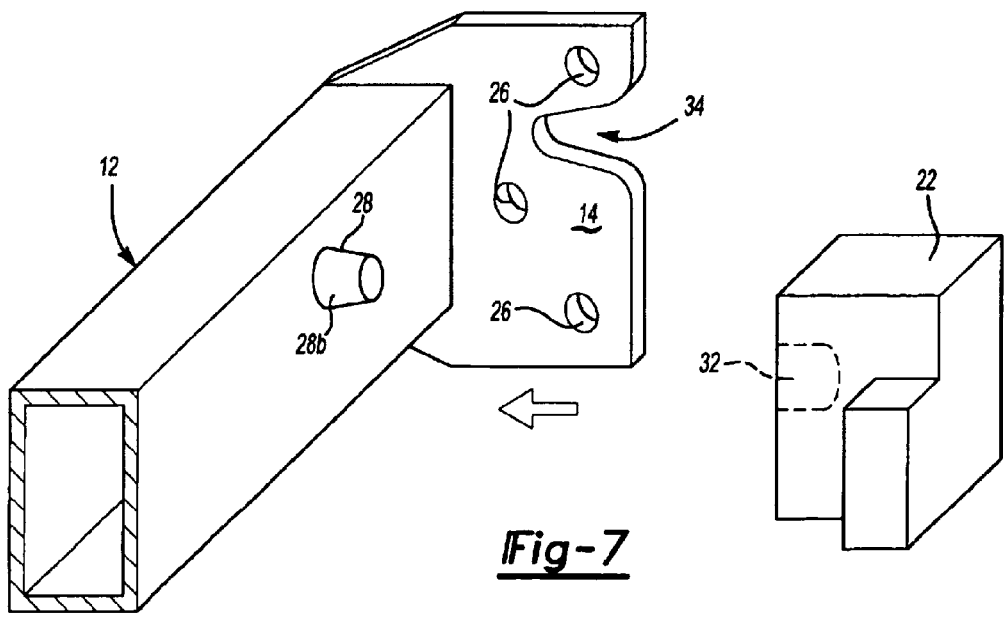
FIG. 7 shows a perspective view of the strengthening structure and the latch mechanism where the strengthening structure includes a tongue.
Figure 8:
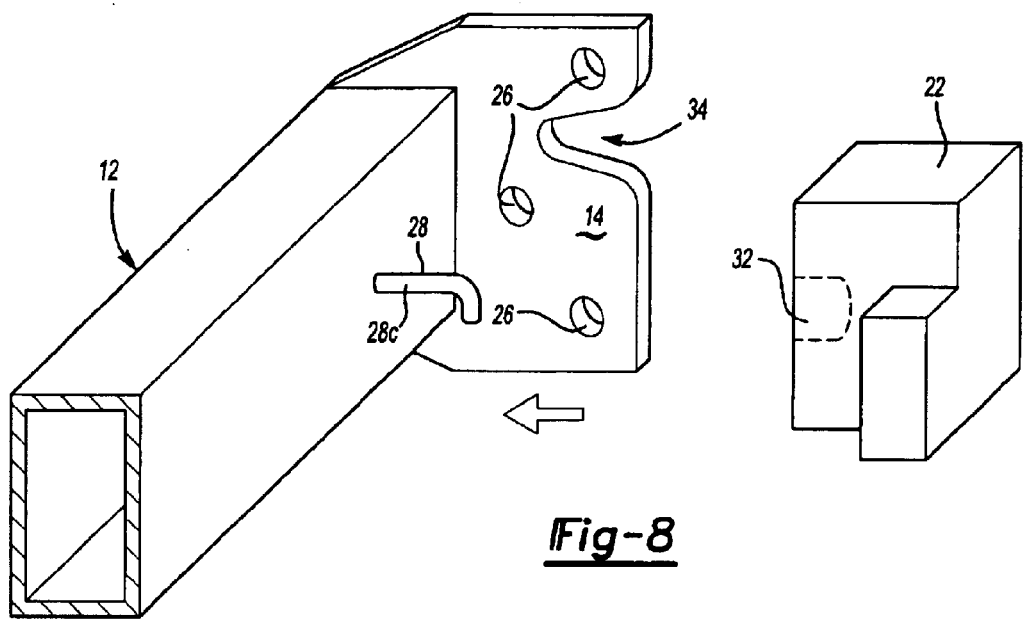
FIG. 8 shows a perspective view of the strengthening structure and the latch mechanism where the strengthening structure includes a hook.
Figure 9:
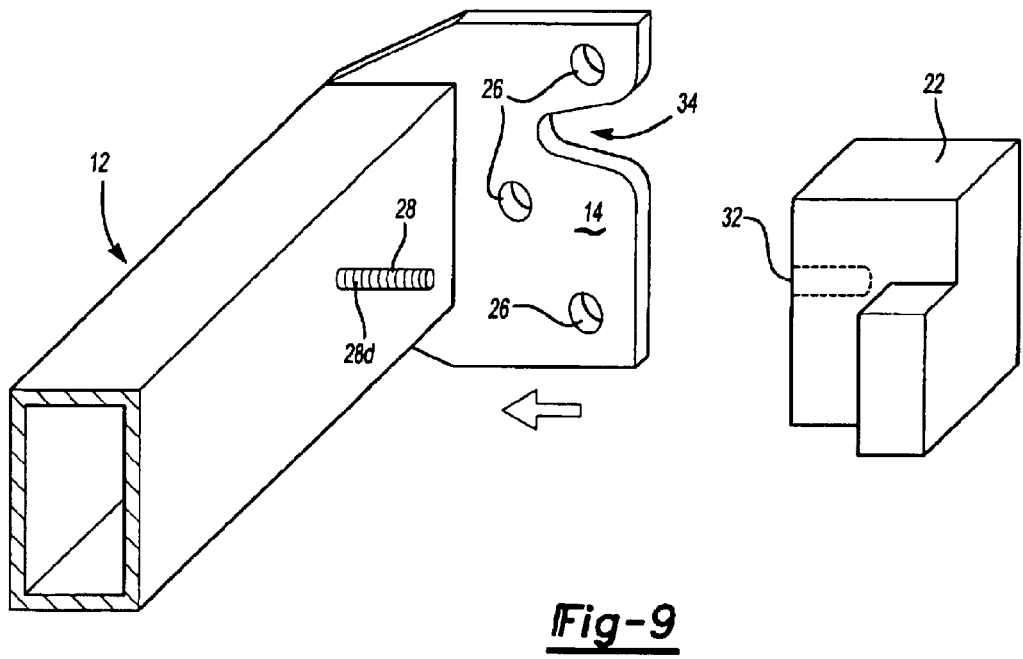
FIG. 9 shows a perspective view of the strengthening structure and the latch mechanism where the strengthening structure includes a flexible screw.

The protrusion 28 may be formed or attached to either the latch mechanism 22 or the strengthening structure 12. The protrusion 28 may also take the form of a tongue 28b (shown in FIG. 3), or a hook 28c (shown in FIG 4), or a flexable screw (shown in FIG. 5). The protrusion 28 described above as generally cylindrical shaped spigot is described by way of example only. The protrusion 28 can have various cross sectional shapes and may be tubular or non tubular in form. The deformable teeth 30 may also be replaced by other fixing means, such as deformable prongs that engage the inside rim of the fixing hole 32. If the protrusion 28 is located on the strengthening structure 12, the protrusion 28 can be a spigot 28a, a tongue 28b, a hook 28c, or a flexible screw 28d as shown in FIGS. 6, 7, 8 and 9 respectively.

Alternatively, but less preferably, the latch mechanism 22 may be non-rigidly held in place to the strengthening structure 12 by a clipping arrangement between the latch mechanism 22 and the strengthening structure. Such an arrangement does not require a slot, aperture or a recess that cooperate with the protrusion 28.

The invention conveniently allows a latch mechanism 22 to be loosely and temporarily held in position ready for rigid fixing at the time of fixing the inner door skin 18. The door 10 of the invention has enhanced resistance to forced opening of the lock during a collision as the latch mechanism 22 is directly fixed to a strengthening structure 12 designed to resist impact, especially side impact. It is important to prevent doors opening during a collision as the structure is significantly more rigid if the door 10 remains in place and is therefore able to stiffen the side structure of the vehicle 10.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle door comprising:
   a strengthening structure including one of a corresponding slot, an aperture and a recess;
   an inner door skin;
   a latch mechanism housed within the vehicle door;
   an engagement member to position the latch mechanism non-rigidly within the vehicle door after the inner door skin has been positioned relative to the strengthening structure, and the engagement member is a protrusion on the latch mechanism which engages the one of the corresponding slot, the aperture and the recess included in the strengthening structure; and
   a fixing member to rigidly hold the inner door skin and the latch mechanism to the strengthening structure.

2. The vehicle door according to claim 1, wherein the strengthening structure is rigidly held between the latch mechanism and the inner door skin.

3. The vehicle door according to claim 2 wherein the strengthening structure includes an elongated section defining a longitudinal axis and a plate section formed in a plane generally orthogonal to the longitudinal axis of the elongated section.

4. The vehicle door according to claim 3 wherein the plate section is attached to the strengthening structure.

5. The vehicle door according to claim 1, wherein the inner door skin has a rim portion, and the fixing member engages the rim portion of the inner door skin.

6. The vehicle door according to claim 1 wherein the protrusion is one of a tongue, a hook, a screw, and a spigot.

7. The vehicle door according to claim 6 wherein the protrusion is flexible to assist with engagement in the one of the corresponding slot, the aperture, and the recess included in the strengthening structure.

8. The vehicle door according to claim 1 wherein the protrusion is one of a flexible screw and a spigot having ratchet teeth.

9. The vehicle door according to claim 1 further including an outer skin that is adjacent to the strengthening structure.

10. The vehicle door as recited in claim 1 further including an outer skin secured to the strengthening structure.

11. The vehicle door as recited in claim 1 wherein the strengthening structure is located between the latch mechanism and the inner door skin.

12. The vehicle door as recited in claim 1 wherein the fixing member rigidly holds both the inner door skin and the latch mechanism to the strengthening structure.

13. A vehicle door comprising:

a strengthening structure;

an inner door skin;

a latch mechanism housed within the vehicle door, and the latch mechanism includes one of a corresponding slot, an aperture and a recess;

an engagement member to position the latch mechanism non-rigidly within the vehicle door after the inner door skin has been positioned relative to the strengthening structure, and the engagement member is a protrusion on the strengthening structure which engages the one of the corresponding slot, the aperture and the recess included in the latch mechanism; and a fixing member to rigidly hold the inner door skin and the latch mechanism to the strengthening structure.

14. The vehicle door according to claim 13 wherein the protrusion is one of a tongue, a hook, a screw, and a spigot.

15. The vehicle door according to claim 14 wherein the protrusion is flexible to assist with engagement in the one of the corresponding slot, the aperture, and the recess included in the latch mechanism.

16. The vehicle door according to claim 13 wherein the protrusion is one of a flexible screw and a spigot having ratchet teeth.

* * * * *